United States Patent [19]

Nishizawa et al.

[11] Patent Number: 4,792,044

[45] Date of Patent: Dec. 20, 1988

[54] MAGNETIC TAPE PANCAKE PACKAGE

[75] Inventors: Yoshito Nishizawa; Shigeo Kamata, both of Odawara, Japan

[73] Assignee: Fuji Photo Film Co., Ltd., Japan

[21] Appl. No.: 140,940

[22] Filed: Dec. 28, 1987

Related U.S. Application Data

[63] Continuation of Ser. No. 888,361, Jul. 23, 1986, abandoned.

[30] Foreign Application Priority Data

Aug. 2, 1985 [JP] Japan .......................... 60-118895[U]

[51] Int. Cl.⁴ .............................................. B65D 85/67
[52] U.S. Cl. .................................... 206/394; 206/303; 206/408; 206/413; 206/497; 206/503; 206/515; 360/134; 365/56
[58] Field of Search ............... 206/303, 309, 310, 312, 206/389, 391, 394, 403, 408, 410, 411, 413, 414, 416, 499, 516, 444, 515, 497, 509, 503; 360/132, 134, 133; 365/52, 53, 55, 56

[56] References Cited

U.S. PATENT DOCUMENTS 4,081,151 3/1978 Ender et al. ................... 206/509 X
4,708,246 11/1987 Minion ............................. 206/394

Primary Examiner—Stephen Marcus
Assistant Examiner—Bryon Gehman
Attorney, Agent, or Firm—Gerald J. Ferguson, Jr.

[57] ABSTRACT

A magnetic tape pancake package includes a plurality of pancakes respectively comprising a hub having a width slightly larger than the width of a magnetic tape, and the magnetic tape wound around the hub. A plurality of spacers are stacked together with the pancakes between the stacked pancakes and at the top and the bottom of the stack of the pancakes. Each spacer is formed into a disk-like shape having a diameter larger than the diameters of the pancakes and provided with a recess at a section contacting the hub for engagement with a hub end face section protruding from the magnetic tape wound around the hub. The pancakes and the spacers are wrapped in a lump with an expansible and-/or contractible film.

6 Claims, 5 Drawing Sheets

MAGNETIC TAPE PANCAKE PACKAGE

This application is a continuation of Ser. No. 888,361, filed 7/23/86, now abandoned.

BACKGROUND OF THE INVENTION

1. Field of the Invention

This invention relates to a magnetic tape pancake package. This invention particularly relates to a magnetic tape pancake package wherein a plurality of pancakes respectively comprising a hub having a width slightly larger than the width of a magnetic tape, and the magnetic tape having a predetermined length and wound around the hub are packaged in the form stacked in the axial direction of the hub.

2. Description of the Prior Art

In an intermediate process prior to fabrication of a final product comprising a magnetic tape, a semi-finished product called the magnetic tape pancake is produced. The magnetic tape pancake comprises a hub having no flange and having a width slightly larger than the width of the magnetic tape, and the magnetic tape having a predetermined length wound around the hub. The magnetic tape pancake has a thin general shape and a large diameter.

When the magnetic tape pancakes thus produced are conveyed to delivery destinations or the like, a plurality of the pancakes are packed into a single pack in the form stacked in the axial direction of the hub, several packs are loaded together on a pallet, and conveyed to the delivery destinations by a conveyance means such as a truck.

FIG. 4 is a partially sectional side view showing the conventional magnetic tape pancake package. Generally, one pack comprises eight pancakes. The conventional magnetic tape pancake package comprises nine stacked pan-like cases 21, 21, . . . Each of the cases 21, 21, . . . has an octagonal outer shape formed by chamfering four corners of a square and has a doughnut-like recess on the upper and lower surfaces. Pancakes 23, 23, . . . are housed one by one in doughnut-like spaces 22, 22, . . . formed by the recesses of the vertically adjacent cases 21, 21, which are positioned to face each other. A cover plate 24 is placed on the upper side of the top case 21, and a bottom plate 26 is placed under the bottom case 21 via a cushioning material 25. The combination thus formed is tightened crosswise with bands as a single pack.

In the package of the aforesaid configuration, since the doughnut-like spaces are formed to a size slightly larger than the size of the pancakes 23, 23, . . . to accommodate the dimensional tolerance of the pancakes 23, 23, . . . , gaps arise between the pancakes 23, 23, . . . and the cases 21, 21, . . . when the pancakes 23, 23, . . . are housed in the spaces. Therefore, when the pancakes 23, 23, . . . packed into a single pack are subjected to external force caused by vibration, shock or the like, the winding appearances of the magnetic tapes wound around the hubs are disturbed, and the edges of the disturbed magnetic tapes strike against the case 21, 21, . . . and are damaged thereby in the worst case. Further, when the winding appearances of the magnetic tapes are disturbed, a problem arises in rewinding of the magnetic tapes from the pancakes 23, 23, . . . to different reels at a subsequent process. Also, in the case where the subsequent process is conducted by a customer, the quality of the pancakes will be regarded as low by the customer.

Accordingly, in the conventional package, the pancakes 23, 23, . . . packed into a single pack as described above are put into a corrugated box containing a thick cushioning material at the lower section, and handled in the form housed in the corrugated box, thereby preventing adverse effects of external force caused by vibration, shock or the like.

With this technique, the magnetic tapes may be protected to some extent against external force caused by vibration, shock or the like during conveyance. However, the effect of protection is not sufficient when the pancakes 23, 23, . . . are conveyed over long time or when loading and unloading of the corrugated box is conducted midway during the conveyance. Also, since the corrugated box is large with respect to the pack of the pancakes 23, 23, . . . and double packaging is necessary, the loading efficiency during the conveyance is low and distribution cost becomes high.

SUMMARY OF THE INVENTION

The primary object of the present invention is to provide a magnetic tape pancake package which is free from disturbance of the winding appearance of the magnetic tape and damage of the magnetic tape during conveyance or the like.

Another object of the present invention is to provide a magnetic tape pancake package wherein magnetic tape pancakes are packaged compactly.

In the present invention, instead of inserting pancakes respectively into cases and stacking the cases, spacers and pancakes are sacked alternately. In order to prevent dust or the like from entering exposed peripheral sections of the pancakes and sticking to the magnetic tapes, instead of tightening the cases with bands, the pancakes are wrapped with an expansible and/or contractible film.

The present invention provides a magnetic tape pancake package in which a plurality of pancakes respectively comprising a hub having a width slightly larger than the width of a magnetic tape, and the magnetic tape having a predetermined length and wound around the hub are packaged in the form stacked in the axial direction of the hub, wherein the improvement comprises stacking a plurality of spacers together with said pancakes between said stacked pancakes and at the top and the bottom of the stack of said pancakes, each of said spacers being formed into a disk-like shape having a diameter larger than the diameters of said pancakes and provided with a recess at a section contacting said hub for engagement with a hub end face section protruding from said magnetic tape wound around said hub, and wrapping said pancakes and said spacers in a lump with an expansible and/or contractible film.

Wrapping with the expansible and/or contractible film may be conducted by any method insofar as the stacked spacers and pancakes are maintained in the form closely contacting each other by utilization of expansible and/or contractible characteristics of the film. For example, an expansible film may be used, and the stack of the pancakes and the spacers may be wrapped with the film by stretching the film. Or, a heat shrink film may be used, and may be allowed to shrink by heat processing after the stack of the pancakes and the spacers is covered by the film. The range of wrapping may be the entire surfaces of the stacked spacers and the pancakes. However, for the spacers positioned at the top and the bottom of the stack, the entire surfaces of the two spacers need not always be wrapped and, for example, the center portions of the two spacers may not be partially wrapped.

The term "wrapping pancakes and spacers in a lump" embraces not only the case where the spacers and the pancakes are wrapped together, but also the case where reinforcement plate members or the like are wrapped together with the stack of the pancakes and the spacers when the reinforcement plate members or the like are positioned at the top and the bottom of the stack of the pancakes and the spacers.

In the magnetic tape pancake package of the present invention, since the pancakes and the disk-like spacers having a diameter larger than the diameters of the pancakes are stacked alternately in the form closely contacting each other and wrapped with an expansible and/or contractible film, it is possible to eliminate disturbance in winding appearance of the magnetic tape and damage of the magnetic tape due to external force caused by vibration, shock or the like during conveyance or the like. Also, it becomes unnecessary to conduct double packaging by use of a cushioning material as in the conventional technique, and it becomes possible to make the package compact. Further, unlike the conventional package in which pancakes housed in cases are maintained in the condition sealed from dust or the like by stacking the cases, the sealed condition is maintained in the present invention by the disklike spacers and wrapping with the expansible and/or contractible film. Therefore, flanges positioned at the peripheries of the pancakes, which are provided on the conventional cases, become unnecessary, and therefore the package becomes small. Thus the packages in accordance with the present invention may be loaded on a single pallet in a number approximately double the number of the conventional packages. Accordingly, it is possible to improve the loading efficiency markedly and to decrease the distribution cost.

DESCRIPTION OF THE PREFERRED EMBODIMENTS

The present invention will hereinbelow be described in further detail with reference to the accompanying drawings.

Figure 1:
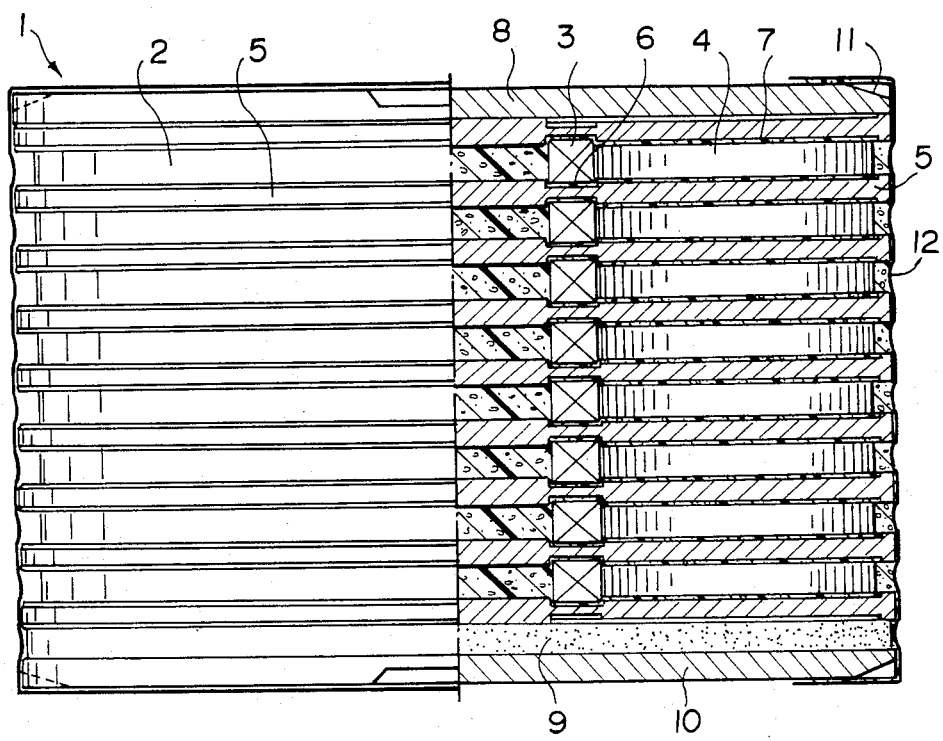
FIG. 1(A) is a partially sectional side view showing an embodiment of the magnetic tape pancake package in accordance with the present invention.
FIG. 1(B) is a detailed enlargement of the area bounded by lines X,X' and Y,Y' as found in the sectional side view of FIG. 1(A)
Figure 1A:
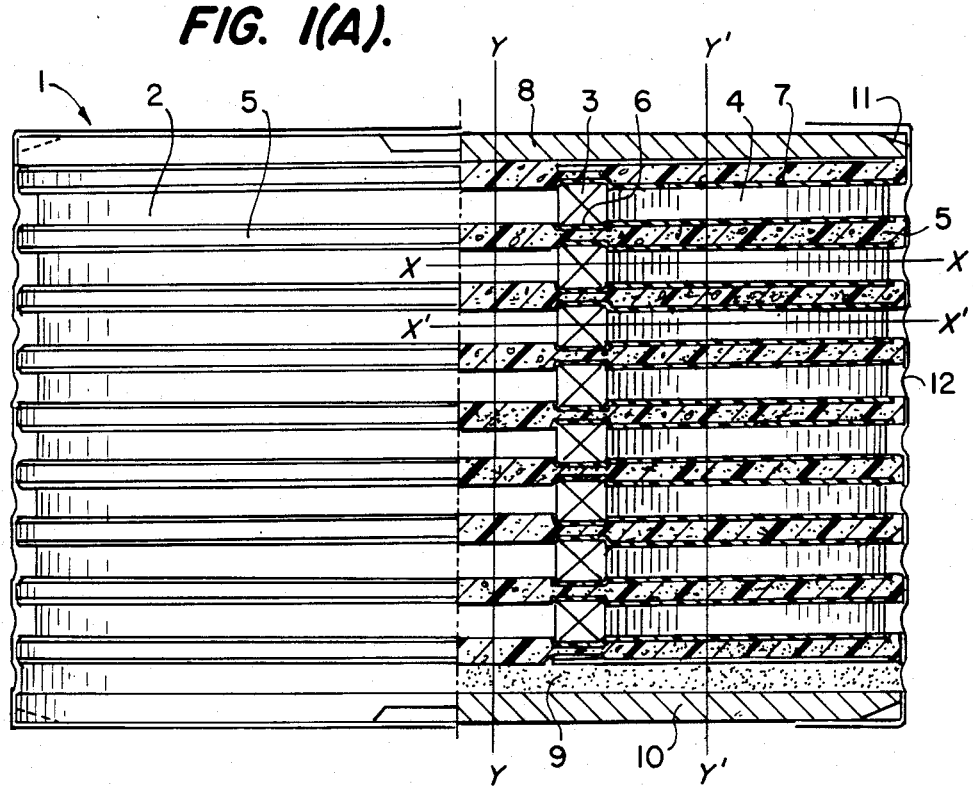
Figure 1B:
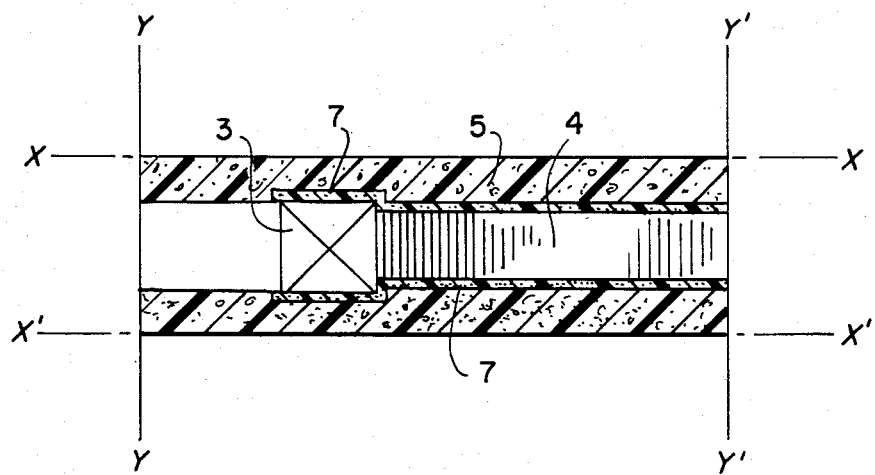

FIG. 1 shows a plurality of magnetic tape pancakes 2, 2, ... packaged with a magnetic tape pancake package 1. The right half of the magnetic tape pancake package 1 is shown in section.

Each of the magnetic tape pancakes 2, 2, ... comprises a ring-like hub 3 and a magnetic tape 4 of a predetermined length wound around the hub 3. The hub 3 has a rectangular cross-section and its width in the vertical direction in FIG. 1 is slightly larger than the width of the magnetic tape 4. In this embodiment, eight pancakes 2, 2, ... are stacked in the axial direction of the hub 3, and spacers 5, 5, ... are positioned between the pancakes 2, 2, ... and at the top and the bottom of the stack of the pancakes 2, 2, ... Each of the spacers 5, 5, ... is formed in a disk shape having a diameter (approximately 360 mm) slightly larger than the roll diameter of the magnetic tape 4 of the pancake 2. The upper and lower surfaces of the spacer 5 are provided with a doughnut-like recess 6 for engagement with an end face portion of the hub 3 protruding from the magnetic tape 4 at the section of the spacer 5 contacting the hub 3, so that the pancake 2 does not shift laterally. Also, the spacer 5 is fabricated of foamed styrol, and the sections of the upper surface and the lower surface of the spacer 5 contacting the pancake 2 are provided with a foamed polyethylene covering 7 having a thickness of approximately 1 mm so that.

As shown, the nine spacers 5, 5, ... are stacked alternately with eight pancakes 2, 2, ... in close contact with each other. A cover plate 8 is placed on the upper surface of the top spacer 5, and a bottom plate 10 is positioned under the bottom spacer 5 via a cushioning material 9. The cover plate 8 is fabricated of a polyethylene polystyrene copolymer formed into a disk shape having the same diameter as the diameter of the spacer 5, and provided with four notches 11, 11, ... at the peripheral section for grasping during conveyance or the like. The bottom plate 10 is constituted by positioning the same member as the cover plate 8 upside down. The cushion in material 9 is fabricated of foamed polyethylene formed in a disk shape having a diameter slightly smaller than the diameter of the bottom plate 10 and is secured to the upper surface of the bottom plate 10.

The cover plate 8, the spacers 5, 5, ..., the pancakes 2, 2, ..., the cushioning material 9 and the bottom plate 10 stacked as mentioned above are wrapped together with a polyethylene film 12. Specifically, the film 12 is formed into a strip-like shape having a thickness of approximately 25μ, and a width of approximately 1.5 times the length from the upper surface of the cover plate 8 to the lower surface of the bottom plate 10. The film 12 is applied to the peripheral sections of the cover plate 8, the spacers 5, 5, ... and the bottom plate 10, stretched in the longitudinal direction, and wound approximately seven turns around the stack along the peripheral sections. Therefore, in the wrapped condition, the peripheral sections from the cover plate 8 to the bottom plate 10 are sealed by the shrinking force of the film 12, and force for contracting the space between the cover plate 8 and the bottom plate 10 acts on the stack. In this manner, the pancakes 2, 2, ... and the spacers 5, 5, ... positioned between the cover plate 8 and the bottom plate 10 are maintained in the condition closely contacting each other.

Figure 2:
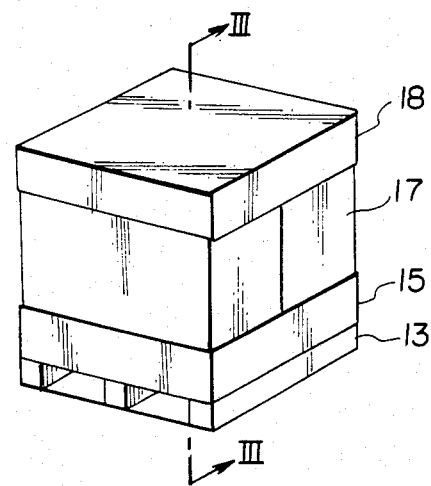
FIG. 2 is a perspective view showing the magnetic tape pancake package of FIG. 1 packed and loaded on a pallet.
Figure 3:
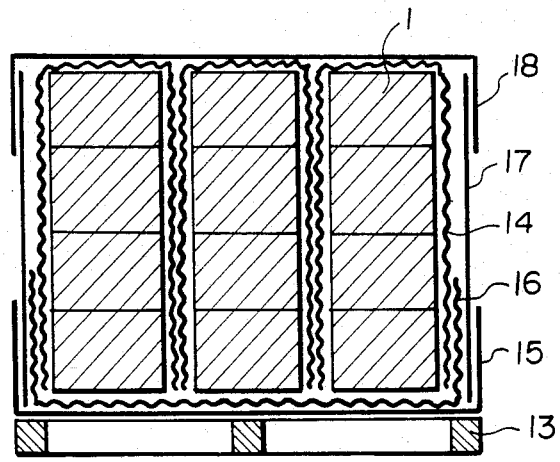
FIG. 3 is a sectional view taken along line III—III of FIG. 2.
Figure 4:
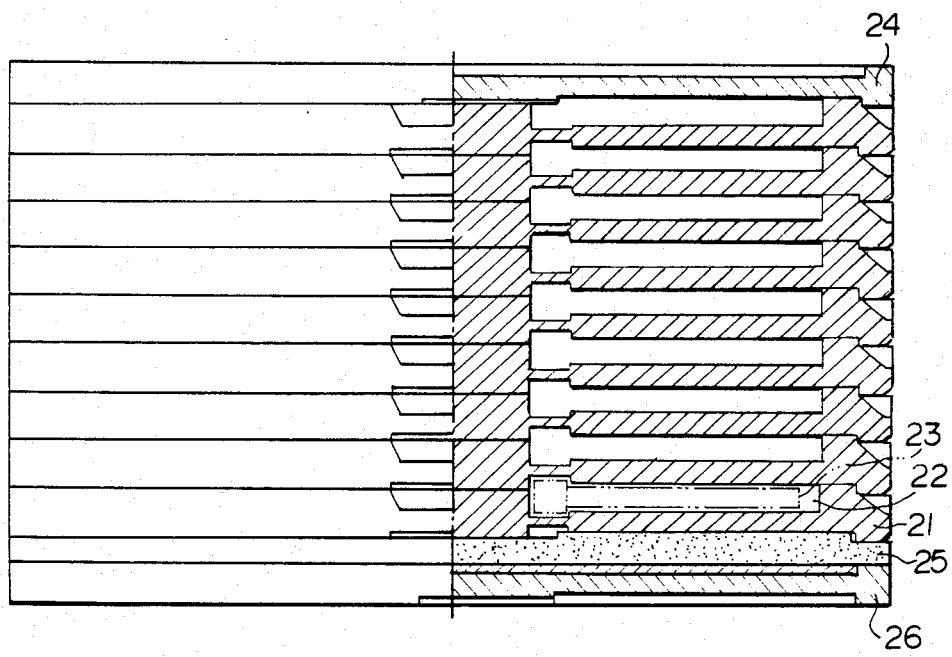
FIG. 4 is a partially sectional side view showing the conventional magnetic tape pancake package.
Figure 5:
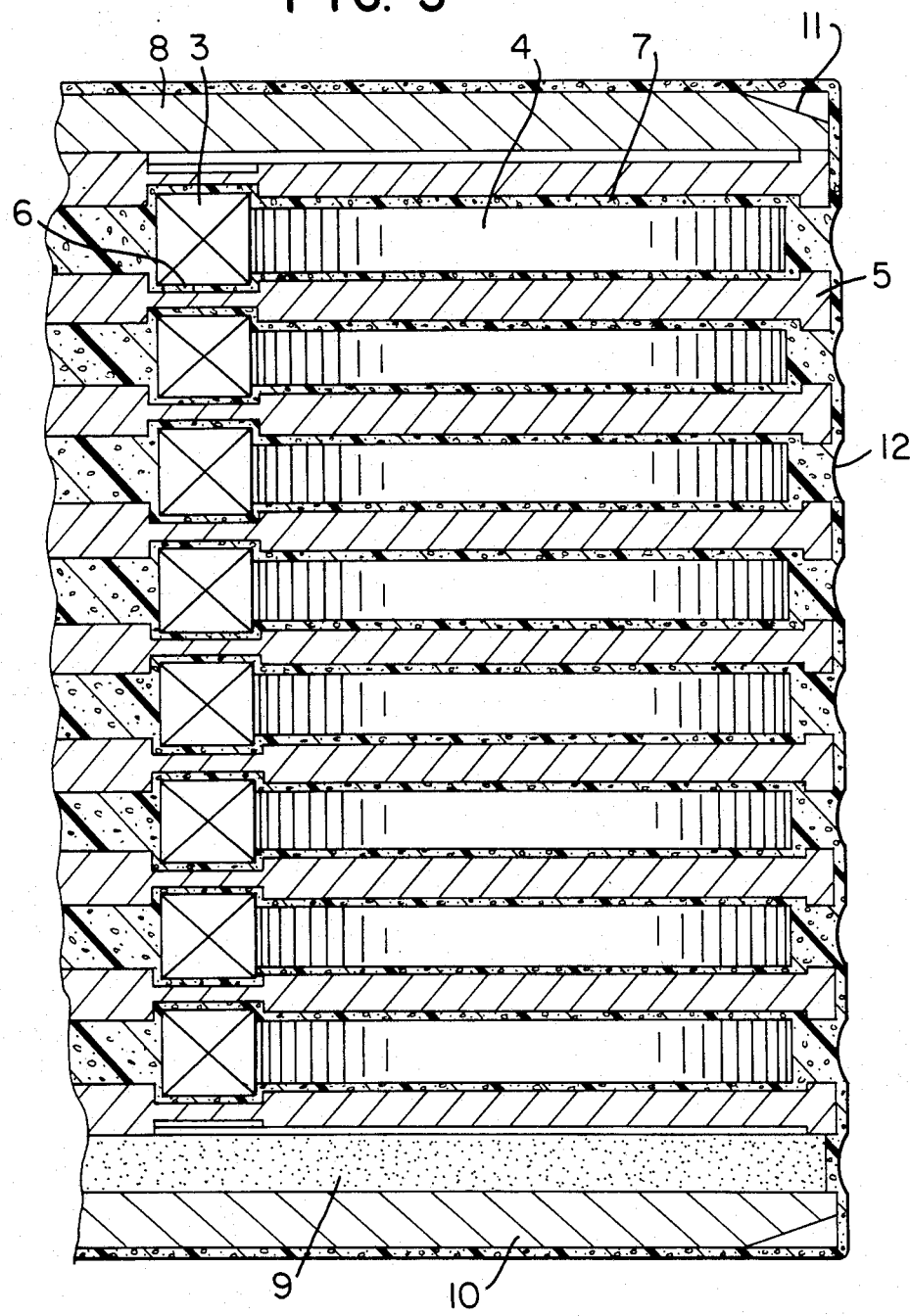

FIGS. 2 and 3 show the loading condition of the pancakes 2, 2, ..., which are packaged as shown in FIG. 1, on a pallet 13.

Four packages 1, 1, ... containing the pancakes 2, 2, ... are stacked vertically, and packed with a sleeve-like aluminium-polyethylene laminated film 14 as one set. Nine (i.e. 3×3) sets are inserted into a corrugated board tray 15 via an aluminium-polyethylene laminated film sheet 16 with the tray 15 being placed on the pallet 13. A corrugated board sleeve 17 is positioned along the inner surfaces of the tray 15, and a tray 18 constituted by the same member as the tray 15 is positioned upside down and applied from above the sleeve 17. Thereafter, the packages are handled in this condition.

We claim:

1. A magnetic tape pancake package for stacking a plurality of magnetic tape pancakes which each include a hub having a width slightly larger than the width of a magnetic tape, the magnetic tape having a predetermined length, the magnetic tape being wound around the hub, said magnetic tape pancake being adapted for stacking in the axial direction of the hub, wherein the improvement comprises a plurality of spacers, one disposed between each of said magnetic tape pancakes to form a stack, additional spacers being disposed at the top and bottom of said stack, each of said spacers having a body with a disk-like shape having a diameter larger than corresponding diameters of said magnetic tape pancakes and having an annular recess at a predetermined radial location on both sides of said disk;

each said annular recess being disposed to snugly receive the hub of one of said plurality of magnetic tape pancakes so as to prevent lateral movement thereof relative to each respective said spacer when in a stack;

each said annular recess being shallower than half the width of said hub such that, when in a stack, adjacent ones of said spacers are spaced apart such that neighboring ones of said spacers in said stack are not in supporting contact; each of said spacers in said stack, other than the bottom most spacer, being substantially entirely supported by an adjacent lower one of said plurality of magnetic tape pancakes;

each said spacer, in a region radially outward of said annular recess, having a substantially flat region which, when said spacer is in said stack, closely contacts the magnetic tape of an adjacent one of said magnetic tape pancakes to prevent disturbance of the winding of the magnetic tape; said magnetic tape pancakes, when in a stack with said spacers, being wrapped snugly with a film.

2. A magnetic tape pancake package as defined in claim 1 wherein said spacers are fabricated of foamed styrol.

3. A magnetic tape pancake package as defined in claim 1 or 2 wherein upper and lower surfaces of each of said spacers are provided with a foamed polyethylene covering at sections contacting said magnetic tape pancakes.

4. A magnetic tape pancake package as defined in claim 1 wherein a reinforcement member is positioned at the top and the bottom of the stack of said magnetic pancakes tape and said spacers.

5. A magnetic tape pancake package as defined in claim 4 wherein said reinforcement member positioned at the top of said stack is fabricated of a polyethylene-polystyrene copolymer and provided with notches.

6. A magnetic tape pancake package as defined in claim 4 wherein said reinforcement member positioned at the bottom of said stack is provided with a cushioning material at the upper surface thereof.

* * * * *